United States Patent
Jones et al.

(10) Patent No.: US 11,308,476 B1
(45) Date of Patent: Apr. 19, 2022

(54) PROXIMITY PEER TO PEER MOBILE NAVIGATION SYSTEM AND METHOD

(71) Applicant: UIPCO, LLC, San Antonio, TX (US)

(72) Inventors: Quian Antony Jones, San Antonio, TX (US); Ryan Russell, San Antonio, TX (US); Ashley Raine Philbrick, San Antonio, TX (US); Carlos JP Chavez, San Antonio, TX (US); Stacy Callaway Huggar, San Antonio, TX (US); Janelle Denice Dziuk, Falls City, TX (US); Yevgeniy Khmelev, San Antonio, TX (US); Ravi Durairaj, San Antonio, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/400,072

(22) Filed: May 1, 2019

Related U.S. Application Data

(60) Provisional application No. 62/785,785, filed on Dec. 28, 2018.

(51) Int. Cl.
  *G06Q 20/32* (2012.01)
  *H04W 8/00* (2009.01)
  (Continued)

(52) U.S. Cl.
  CPC ..... *G06Q 20/3224* (2013.01); *G06F 3/04817* (2013.01); *G06Q 20/223* (2013.01);
  (Continued)

(58) Field of Classification Search
  CPC . G06Q 20/3224; G06Q 20/223; H04W 4/029; H04W 40/244
  See application file for complete search history.

(56) References Cited

U.S. PATENT DOCUMENTS 7,680,738 B2 * 3/2010 Amann ................ G06Q 20/102
  705/43
7,783,571 B2   8/2010 Fish et al.
(Continued)

OTHER PUBLICATIONS

A. Iqbal, F. Shabnam, N. T. Rouf, I. B. Jafar, and K. Raihana, "Implementation of a low cost hybrid Automated Teller Machine (H-ATM) with integrated currency exchange capability," 2012 7th International Conference on Electrical and Computer Engineering, 2012, pp. 929-932 (Year: 2012).

(Continued)

*Primary Examiner* — Christopher Bridges
(74) *Attorney, Agent, or Firm* — Plumsea Law Group, LLC

(57) ABSTRACT

A system and method for locating mobile communication devices in a peer to peer communication using a beacon. The system and method include determining a first location of a first mobile communication device and transmitting the beacon from the first mobile communication device, which may be received by a second mobile computing device. In response to the beacon, the first mobile communication device may receive a message from a second mobile communication device. A peer to peer communication between the first mobile communication device and the second mobile communication device based on the message may be established. The first mobile communication device may receive a second location of the second mobile communication device from the second mobile communication device, and display both the first location and the second location on a map of the first mobile communication device.

20 Claims, 12 Drawing Sheets

(51) Int. Cl.
*H04W 4/029* (2018.01)
*G06Q 20/22* (2012.01)
*H04W 76/14* (2018.01)
*H04W 40/24* (2009.01)
*G06Q 20/38* (2012.01)
*G06F 3/04817* (2022.01)

(52) U.S. Cl.
CPC .......... *G06Q 20/388* (2013.01); *H04W 4/029* (2018.02); *H04W 8/005* (2013.01); *H04W 40/244* (2013.01); *H04W 76/14* (2018.02)

(56) References Cited

U.S. PATENT DOCUMENTS

| | | | |
|---|---|---|---|
| 8,620,368 B2* | 12/2013 | Hansen | G01S 1/44 455/515 |
| 8,838,477 B2* | 9/2014 | Moshfeghi | G06Q 20/3278 705/14.58 |
| 9,204,257 B1* | 12/2015 | Mendelson | G07B 15/00 |
| 9,759,566 B2* | 9/2017 | Ruckart | G01C 21/005 |
| 9,959,512 B2* | 5/2018 | Camp | G06Q 10/06311 |
| 10,002,387 B2 | 6/2018 | Johnson et al. | |
| 10,055,726 B2* | 8/2018 | Kursun | G06Q 40/02 |
| 10,217,093 B2* | 2/2019 | Trivedi | G06Q 20/40 |
| 10,223,719 B2* | 3/2019 | Schoeffler | H04N 5/23293 |
| 10,311,422 B2 | 6/2019 | Koeppel et al. | |
| 2006/0069503 A1 | 3/2006 | Suomela et al. | |
| 2010/0114677 A1* | 5/2010 | Carlson | G06Q 40/02 705/14.1 |
| 2011/0182250 A1 | 7/2011 | Shin et al. | |
| 2011/0225087 A1 | 9/2011 | Agrawal | |
| 2011/0251941 A1 | 10/2011 | Dunwoody | |
| 2012/0160912 A1 | 6/2012 | Laracey | |
| 2013/0031009 A1* | 1/2013 | Kapoor | G06Q 20/0855 705/77 |
| 2013/0123310 A1 | 5/2013 | Chong et al. | |
| 2013/0138561 A1 | 5/2013 | Chan | |
| 2013/0159190 A1 | 6/2013 | Paintin | |
| 2014/0263618 A1 | 9/2014 | McCarthy et al. | |
| 2015/0026031 A1 | 1/2015 | Mullin, III | |
| 2015/0058216 A1 | 2/2015 | Luciani | |
| 2015/0095161 A1 | 4/2015 | Goel | |
| 2015/0170133 A1* | 6/2015 | Love | G06Q 20/3272 705/44 |
| 2015/0206117 A1 | 7/2015 | Govindarajan et al. | |
| 2016/0078416 A1* | 3/2016 | DeLuca | H04W 4/021 705/43 |
| 2016/0140555 A1 | 5/2016 | Scipioni | |
| 2016/0180307 A1 | 6/2016 | Laracey | |
| 2017/0148015 A1 | 5/2017 | Edgington et al. | |
| 2017/0188183 A1 | 6/2017 | Lihosit et al. | |
| 2018/0005320 A1 | 1/2018 | Huang et al. | |
| 2018/0089668 A1* | 3/2018 | Wong | G06Q 30/0613 |
| 2018/0114222 A1 | 4/2018 | Furey et al. | |
| 2018/0285842 A1 | 10/2018 | Guntupalli | |
| 2018/0365684 A1 | 12/2018 | Reilly et al. | |
| 2019/0164165 A1 | 5/2019 | Ithabathula | |
| 2019/0236581 A1 | 8/2019 | Hartung et al. | |
| 2020/0005263 A1 | 1/2020 | Arora et al. | |
| 2020/0118204 A1* | 4/2020 | Chakraborty | H04L 9/0637 |
| 2021/0073760 A1 | 3/2021 | Watson et al. | |

OTHER PUBLICATIONS

M. Misbhauddin and M. Alshamari, "Towards a Proximity-Aware, Accessible and Personalized Public Digital Terminal An Initial Study," 2018 21st Saudi Computer Society National Computer Conference (NCC), 2018, pp. 1-6, (Year: 2018).

Final Office Action dated Oct. 13, 2021 for U.S. Appl. No. 16/423,263.

Mario Loncar et al., "Mobile application for finding ATMs", Conference Paper, MIPRO 2015, pp. 1971-1976 (Year 2015).

Non-Final Office Action dated May 25, 2021 for U.S. Appl. No. 16/423,263.

* cited by examiner

PROXIMITY PEER TO PEER MOBILE NAVIGATION SYSTEM AND METHOD

CROSS-REFERENCE TO RELATED APPLICATIONS

This application claims the benefit of Provisional Patent Application No. 62/785,785 filed Dec. 28, 2018, and titled "Proximity Peer to Peer Mobile Navigation System and Method," which is incorporated by reference herein in its entirety.

TECHNICAL FIELD

The present disclosure generally relates to methods and systems for a proximity peer to peer mobile navigation system and method, and in particular, to a system and method for locating a mobile device using a beacon and facilitating an exchange.

BACKGROUND

Electronic payment using a mobile communications device are increasingly popular in a movement toward a cashless market. Because a fee is frequently charged to a vendor for each electronic transaction, many vendors require cash to avoid this electronic transaction fee. For example, many venues such as sporting venues, festivals, and other entertainment venues frequently require cash instead of electronic payment. However, since many potential customers of vendors do not carry cash or forget to bring cash, these potential customers cannot make purchases from vendors such as food, drink, and souvenirs. Therefore, there is a need for potential customers to obtain cash to make these purchases or make other exchanges.

There is a need in the art for a system and method that addresses the shortcomings discussed above.

SUMMARY

In one aspect, a method of locating mobile communication devices in a peer to peer communication using a beacon. The method may include determining a first location of a first mobile communication device, transmitting the beacon from the first mobile communication device, receiving, by the first mobile communication device, a message in response to the transmitted beacon from a second mobile communication device, establishing the peer to peer communication between the first mobile communication device and the second mobile communication device based on the message, and receiving, by the first mobile communication device, a second location of the second mobile communication device from the second mobile communication device. The method may further include accessing a map of a local area, which includes the first location and the second location, and displaying the map on a display of the first mobile communication device, displaying a first icon indicating the first location and a second icon indicating the second location on the map of the display of the first mobile communication device, displaying one or more routes between the first location and the second location on the displayed map, moving the first mobile communication device from the first location to the second location, and conducting a transaction, which includes mutual authentication to conduct the transaction.

In another aspect, a non-transitory computer readable medium storing software including instructions executable by one or more computers, which, upon such execution, cause the one or more computers to determine a first location of a first mobile communication device, transmit a beacon from the first mobile communication device, receive, by the first mobile communication device, a message in response to the transmitted beacon from a second mobile communication device, establish a peer to peer communication between the first mobile communication device and the second mobile communication device based on the message, and receive, by the first mobile communication device, a second location of the second mobile communication device from the second mobile communication device. The non-transitory computer readable medium storing software including instructions executable by one or more computers, which, upon such execution, may further cause the one or more computers to access a map of a local area, which includes the first location and the second location, and display the map on a display of the first mobile communication device, display a first icon indicating the first location and a second icon indicating the second location on the map of the display of the first communication device, display one or more routes between the first location and the second location on the displayed map, move the first mobile communication device from the first location to the second location, and conduct a transaction, which includes mutual authentication to conduct the transaction.

In another aspect, a system may locate mobile communication devices in a peer to peer communication using a beacon. The system may include a wireless network coupled to a plurality of base stations, a base station coupled to the wireless network, a first mobile communication device to determine a first location of the first mobile communication device and to transmit a beacon, where the first mobile communication device coupled to the wireless network though one of the base stations, and a second mobile communication device to determine a second location of the second mobile communication device and to receive the beacon, where the second mobile communication device coupled to the wireless network though one of the base stations. The first mobile communication device may receive a message in response to the transmitted beacon from a second mobile communication device, and the first mobile communication device may establish a peer to peer communication with the second mobile communication device based on the message. The second mobile communication device may transmit the second location of the second mobile communication device to the first mobile communication device. The first mobile communication device may access a map of a local area, which includes the first location and the second location, and display the map on a display of the first mobile communication device. The first mobile communication device may display a first icon indicating the first location and a second icon indicating the second location on the map of the display of the first mobile communication device. The first mobile communication device may display one or more routes between the first location and the second location on the displayed map. The first mobile communication device may be moved from the first location to the second location, and the first mobile communication device may be used to conduct a transaction, which includes authentication to conduct the transaction.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The description can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
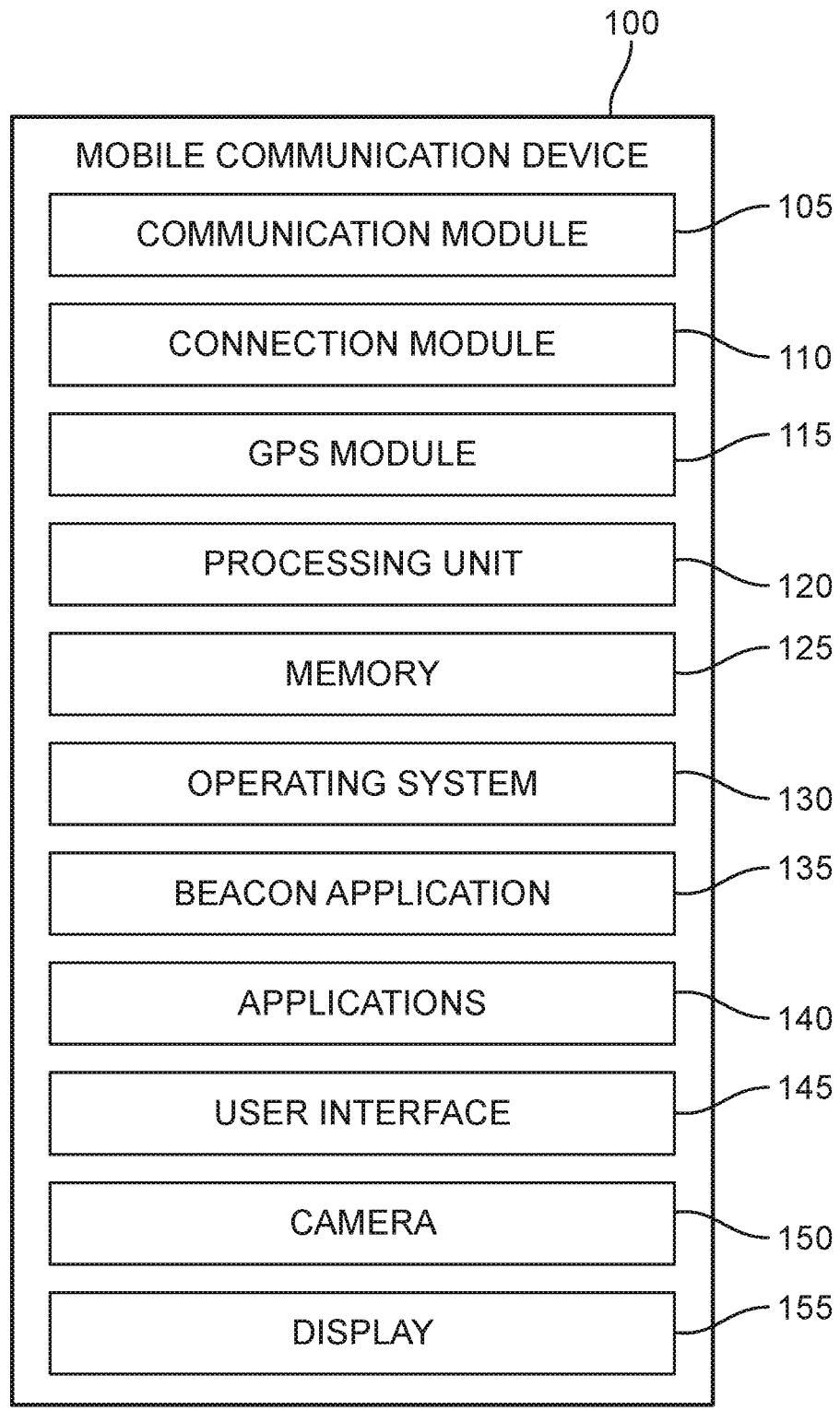
FIG. 1 is a schematic view of a mobile communication device according to an embodiment.

Embodiments provide systems and methods for a proximity peer to peer mobile navigation which locates mobile communication devices using a beacon and places these mobile communication devices in peer to peer communication. Beacons may communicate with mobile communication devices in possession of users in order to connect to with one or more mobile communication devices and in order to determine whether one or more users of mobile devices are in close proximity to the beacon in order to potentially establish a peer to peer communication with at least one mobile communication device.

By providing peer to peer communication, more precise location information can be exchanged and displayed to the users of the mobile communication devices in order to facilitate a meeting between the two users. For example, the display may show one or more routes on a map for a user of one of the mobile communication devices to follow in order to meet a user of another mobile communication device. The meeting can be a meeting to perform an exchange or transaction to benefit the users of the mobile communication devices.

For example, many individuals have decided not to carry cash and may find themselves in circumstance where cash is needed to make purchases. For example, many venues such as sporting venues, festivals, and other entertainment venues frequently require cash instead of electronic payment. By using a mobile communication device to send a beacon indicating a need for cash and a willingness to make an electronic payment for cash, other users having mobile computing devices in the proximity of the emitted beacon may receive this beacon and one of the users may choose to respond to the beacon by offering cash in exchange for an electronic payment of cash. The responding user may or may not charge an additional fee for the cash.

A peer to peer communication may be fully established between the two users after the user needing cash receives the response. A further exchange of texts, emails, etc. using peer to peer communication may be made if further negotiation is required. For example, the user requesting cash could instead request that the user responding to the request make a cash purchase for an article such as food, drink, and/or souvenirs. The user requesting cash could then meet the user having cash or an article to electronically pay for cash or the articles because both users recognize their locations on the displayed map, which also displays routes to locations to meet.

In another example, one or more vendors such as stores in a venue, such as sporting venues, festivals, and other entertainment venues, may decide to have extra cash on hand and may send out a beacon offering to provide cash in exchange for an electronic payment plus a fee. Users in close proximity to the beacon may receive the beacon and can display a location of a vendor advertising cash in exchange for an electronic payment. Once the cash runs out for a vendor, the vendor may send out a beacon indicating that there is no more cash available.

Various embodiments are disclosed using a beacon to facilitate exchanges among users of mobile communications devices in need of cash or other articles in exchange for an electronic transfer of money from the customer to the seller.

FIG. 1 is a schematic view of a mobile communication device 100 according to an embodiment. Mobile communication device 100 may be any mobile computing device. Examples of mobile communication device 100 include a smartphone, a tablet, a smartwatch, a smart glass, a smart helmet, and a laptop. A mobile communication device 100 may include a communication module 105, a connection module 110, a GPS module 115, a processing unit 120, a memory 125, an operating system 130, a beacon application 135, applications 140, user interface 145, a camera 150, and a display 150. A mobile communication device 100 having a beacon application 135 is registered with a service provider having a server, so that the service provider can be used to electronically transmit currency or electronically receive currency. The service provider coordinates the electronic transfer of currency between accounts of two different users including providing mutual authentication.

The beacon application 135 may generate a beacon at the request of a user of the mobile communication device 100. The request for generating and transmitting a beacon may be made by the user through user interface 145. The beacon generated by using a beacon application 135 and transmitted from a mobile communication device 100 may communicate with other mobile communication devices in possession of other users in order to connect to the mobile communication device 100 and to determine whether any other mobile communication devices operated by other users are in proximity to the mobile communication device 100, which transmitted the beacon. The other mobile communication devices may have a configuration the same as or similar to the configuration of mobile communication device 100 in FIG. 1, which includes beacon application 135 and which is also registered with the above service provider.

In an embodiment, if a mobile communication device 100 detects the beacon, a peer to peer communication (a peer to peer session) may be automatically established between the mobile communication device 100 generating the beacon and the mobile communication device 100 detecting the beacon which is authorized by the service provider having a server. Once this peer to peer communication is established, other peer to peer communications may or may not be established depending on the embodiment. In this exemplary embodiment, the automatically established peer to peer communication is between the mobile communication device 100 generating the beacon and the closest mobile communication 100 in proximity to the mobile communication device 100 generating the beacon. After establishing this peer to peer communication, pictures of users of the mobile communication devices 100 may be exchanged, which may be used for verification. Additional mutual authentication may also be required.

In another embodiment, one or more mobile communication devices 100 may detect a beacon and automatically form an initial peer to peer connection with the mobile communication device 100 which generated the beacon. As discussed above, all mobile communication devices 100 include a beacon application 135 and are registered with the service provider. However, one or more mobile communication devices 100 operated by other users may choose to respond to the beacon transmitted by the mobile communication device 100 to establish a peer to peer communication (peer to peer session) for further communication. The mobile communication device 100, which generated the beacon, may choose a mobile communication 100 for peer to peer communication in closest proximity to the mobile communication device 100 or the mobile communication device 100 may choose to enter peer to peer communication with the first mobile communication device 100 whose user provides a response to the request included in the beacon transmitted from the mobile communication device 100. Alternatively, the mobile communication device 100, which generated the beacon, may be in peer to peer communication with more than one mobile communication devices 100 based on transmission and/or reception of the beacon. After establishing this peer to peer communication, pictures of users of the mobile communication devices 100 may be exchanged, which may be used for verification. Additional mutual authentication may also be required.

A beacon may provide wireless communication between mobile communication device 100 and other mobile communication devices. For example, a beacon may be transmitted and received through Bluetooth, Bluetooth Low Energy (BLE), Wi Fi, Wi Fi Direct, Long Term Evolution (LTE) Direct, Near Field communication (NFC), or other wireless communication protocols. Alternatively, a beacon may be concurrently transmitted and received through one or more of Bluetooth, Bluetooth Low Energy (BLE), Wi Fi, Wi Fi Direct, Long Term Evolution (LTE) Direct, Near Field communication (NFC), or other wireless communication protocols. As discussed above, the other mobile communication devices may have a configuration the same as or similar to the configuration of mobile communication device 100 in FIG. 1. Therefore, all mobile communication devices may be designated using the reference numeral 100.

A connection module 110 of a mobile communication device 100 may execute specialized hardware and/or software to passively monitor for the various wireless communications, for example, through a communication module 105. When a mobile communication device 100 detects a beacon, both the mobile communication device 100 transmitting the beacon and the mobile communication device 100 receiving the beacon may ramp up in power and establish a peer to peer connection which may be authorized by the service provider. The connection may further enable the two mobile communication devices 100 to communicate additional information, such as connection information (e.g., an identifier) and/or other stored data (e.g., a location or other information). In addition, this connection may permit users of the mobile communication devices 100 to communicate information inputted through a user interface 145 or camera 150 and displayed on display 155.

A user interface 145 of the mobile communication device 100 may include a microphone, a speaker, a keypad, a screen, a touch screen, a cursor control device, a light, a voice recognition system, an optical recognition system that would authenticate a user's iris, for example, and/or any other type of interface that may be employed in the wireless terminal. In some embodiments, the user interface 145 may include therewith ability to service a headset including a microphone and an earpiece for the user. Applications 140 may utilize information inputted through the user interface 145 to provide additional applications to the user.

The processing unit 120 may include any type of processor such as a microprocessor, a digital signal processor, an Application Specific Integrated Circuit (ASIC), or a combination of processing type devices. The processing unit 120 is operable to execute a plurality of software instructions that are stored in memory 125 and downloaded for execution. The plurality of software instructions may include operating system 130, beacon application 135, and other applications 140. The processing unit 120 may also include specialized hardware required to implement aspects of embodiments. The memory 125 may include SRAM, DRAM, PROM, EEPROM, flash RAM, a hard disk drive, an optical media drive, or any other type of memory capable of storing data and instructions.

A GPS module 115 may be software and/or hardware designed to determine the current location of the mobile communication device 100 and/or locations of other mobile communication devices 100. The GPS module 115 may also act as a GPS transmitter or receiver to facilitate the transmission or reception of GPS coordinates. The GPS module 115 and/or one of the applications 140 may be used to show one or more routes between mobile communication devices 100 in peer to peer communication.

Figure 2:
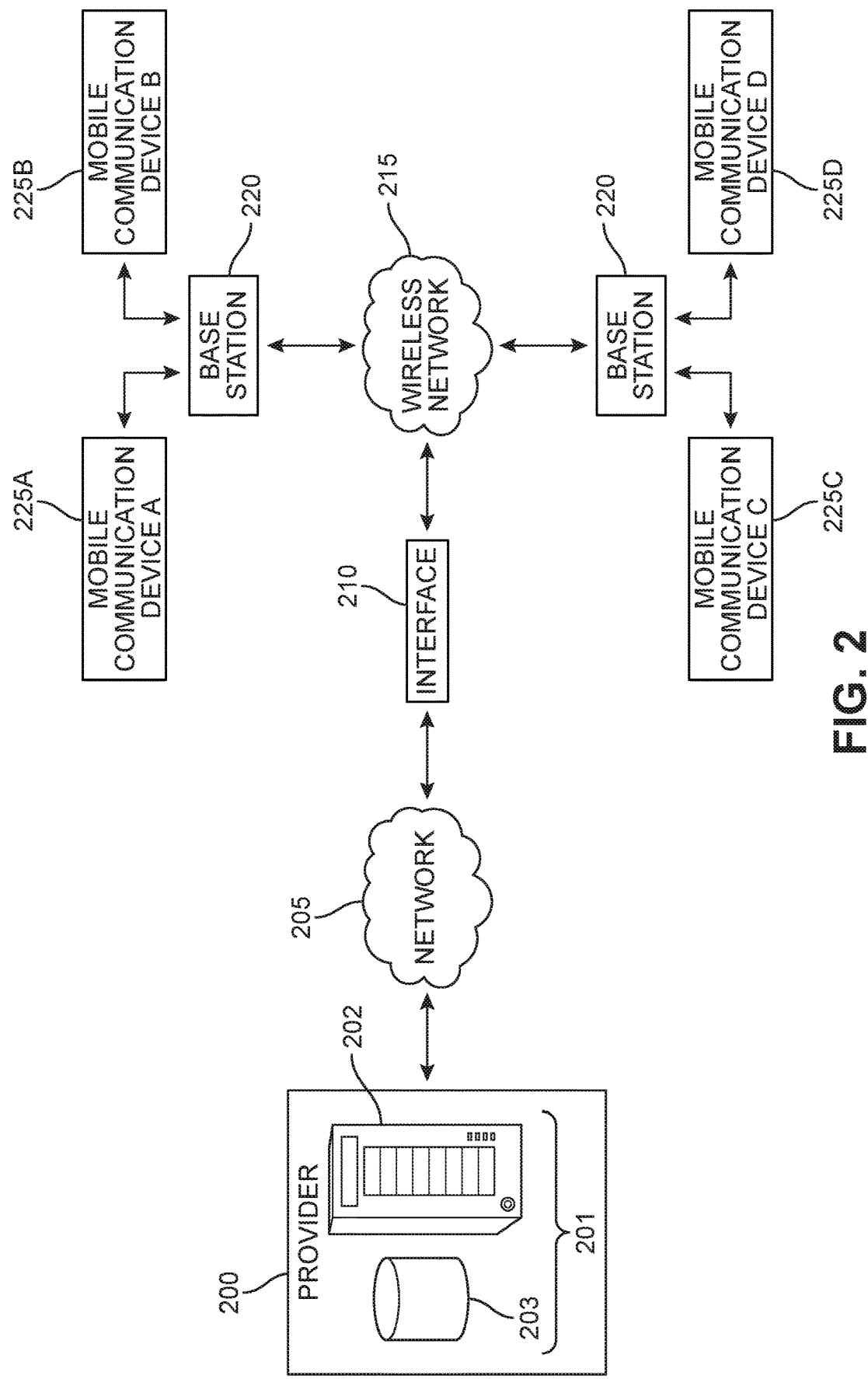
FIG. 2 is a schematic view of mobile communication devices of FIG. 1 in a network system according to an embodiment.

FIG. 2 is a schematic view of mobile communication devices of FIG. 1 in a network system according to an embodiment. FIG. 2 is a system diagram illustrating a wireless communication system that operates according to the present invention. The network system includes a service provider 200 coupled to a network 205 (e.g. the Internet), which may use an interface 210 to couple the network 205 with a wireless network 215. The wireless network 215 communicates with one or more servicing base stations and/or wireless access points 220. It should be noted that FIG. 2 is used only to convey the principles of embodiments and is not intended to be a detailed description of a wireless communication system such as a Wireless Local Area Network (WLAN), a Wireless Wide Area Network (WWAN), or a Wireless Personal Area Network (WPAN). One or more base stations 220 may communicate with one or more mobile communication devices 100. For illustration purposes, the one or more mobile communication devices 100 may be mobile communication device 225A, mobile communication device 225B, mobile communication device 225C and mobile communication device 225D. These mobile communication devices, 225A, 225B, 225C, and 225D may all be registered with the service provider 200 through beacon application 135.

Referring to FIG. 2, service provider 200 may include a centralized computing system 201. The term "computing system" refers to the computing resources of a single computer, the partial computing resources of a single computer, a plurality of computers communicating with one another, or a network of remote servers. In an exemplary embodiment, computing system 201 includes at least one server. A centralized computing system 201 includes one or more computing devices 202 (for example, a server) that may be in communication with one or more databases 203 (memories). Computing device 202 may include one or more processors and a non-transitory computer readable medium. Instructions stored on the non-transitory computer readable medium may be executed by the one or more processors. Databases 203 could be co-located with computing device 201 or could be remote databases that are accessible by computing device 201 over network 205 and/or wireless network 215. Databases 203 can include any kind of storage devices, including but not limited magnetic, optical, magneto-optical, and/or memory, including volatile memory and non-volatile memory.

Mobile communication devices 225A and 225B having a beacon application 135 are registered with the service provider 200, so that the service provider 200 can be used to electronically transmit currency or electronically receive currency. The service provider 200 coordinates the electronic transfer of currency between accounts of two different users including providing mutual authentication. Mutual authentication by both mobile communication devices 225A and 225B may be required by the service provider 200. In order to conduct a transaction, one or more various types of mutual authentication may be required such as biometric authentication. For example, in order for mobile communication devices 225A and 225B to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Therefore, each user may be confident about the integrity of the electronic transaction.

Figure 3:
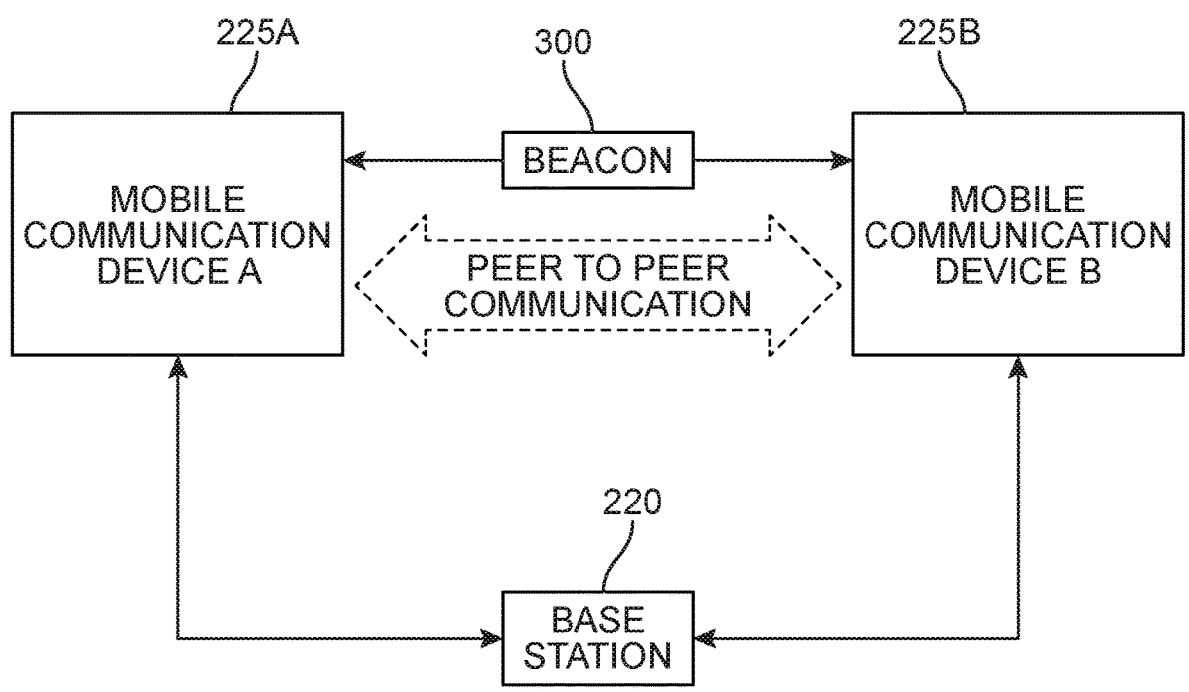
FIG. 3 is a schematic view of mobile communication devices of FIG. 1 in peer to peer communication according to an embodiment.

FIG. 3 is a schematic view of mobile communication devices of FIG. 1 in peer to peer communication according to an embodiment. As shown in FIG. 3, a base station 220 may be wirelessly communicating with a mobile communication device 225A and a mobile communication device 225B. However, mobile communication device 225A may have transmitted a beacon 300 which may be received by mobile communication device 225B. A peer to peer connection for peer to peer communication between mobile communication device 225A and mobile communication device 225B may be established, so that these two users of the two mobile communication devices 225A and 225B may know that they are in close proximity with each other.

Figure 4A:
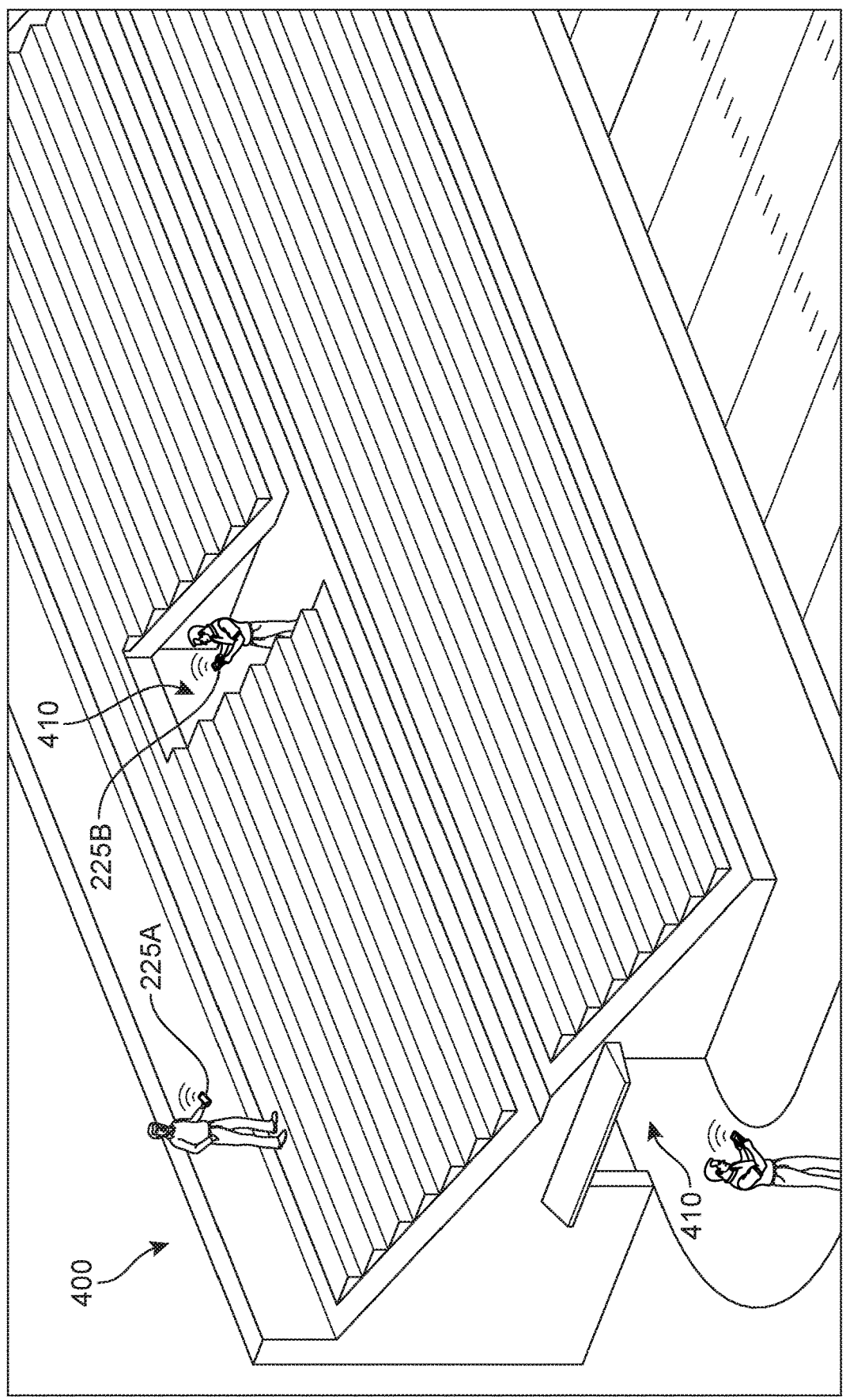
FIGS. 4A-4B are schematic views of mobile communication devices of FIG. 1 in an environment according to an embodiment.
Figure 4B:
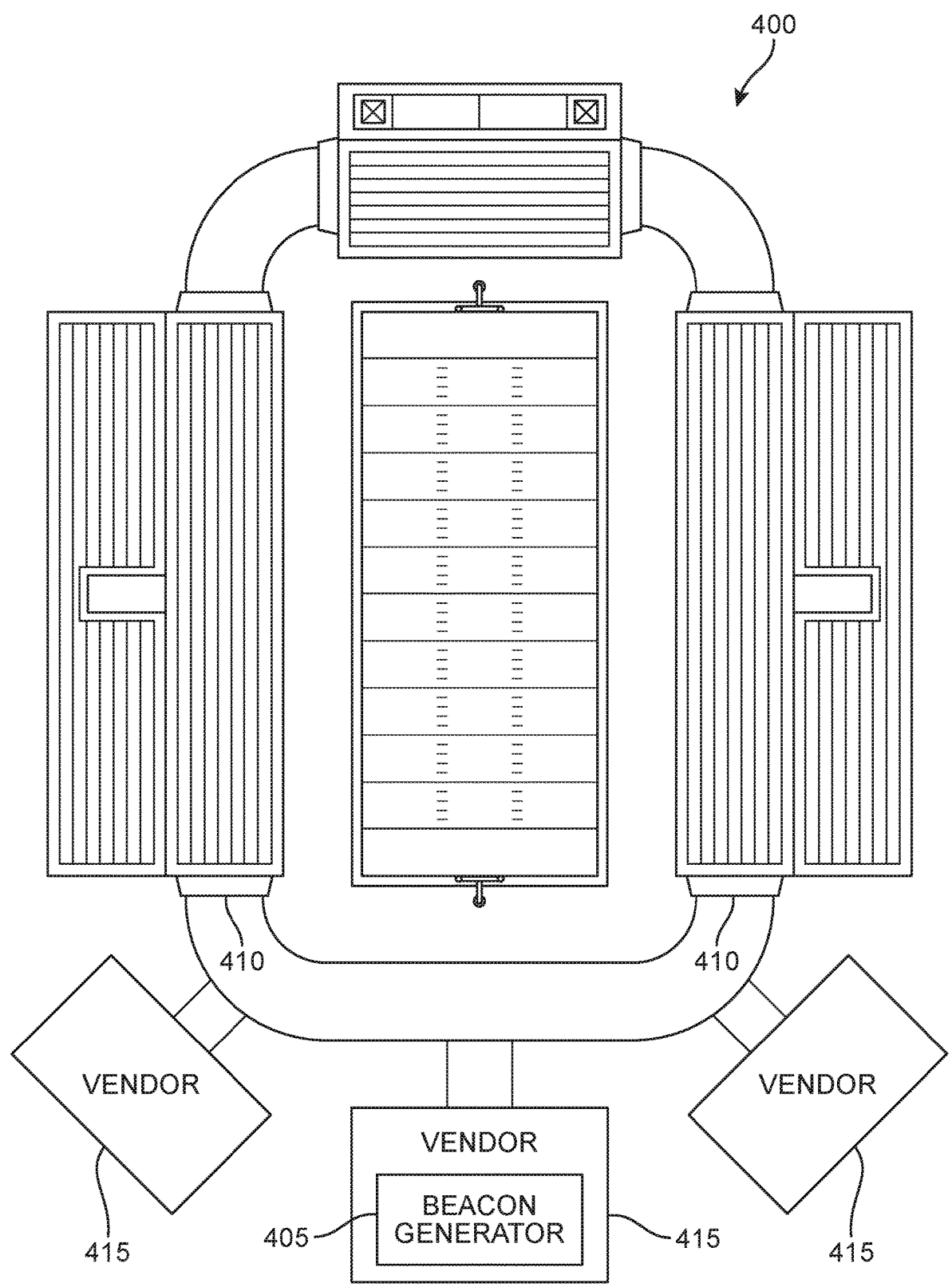

FIGS. 4A are 4B are schematic views of mobile communication devices of FIGS. 1 and 2 in an environment according to an embodiment. The embodiments shown in FIGS. 4A and 4B are described with respect to a venue 400 of an open stadium for a sporting event such as a football game. If the venue 400 is a stadium 400, the venue may include one or more vendors 415 and entrances and/or exits 410 to stadium seating.

One or more beacon generators 405, which may be mounted to a structure such as a stadium 400, vendor equipment or a building housing of a vendor 415, may also be coupled wirelessly to a wireless network such as the wireless network 215. Each of these beacon generators 405 generate beacons, which may provide additional functionality, such as establishing a peer to peer connection or other connection with one or more mobile communication devices 100 (e.g. mobile communication device 225A, mobile communication device 225B, mobile communication device 225C and mobile communication device 225D) or establishing a connection with server to provide notifications that one or more users having mobile communication devices are detected in close proximity to a beacon, and, in certain embodiments, where the user is located at or near a vendor 415. Thus, the beacons may provide proximity detection of users and triangulation of users' positions/locations within a geographic area such as at or near a stadium or stadium area.

Figure 5:
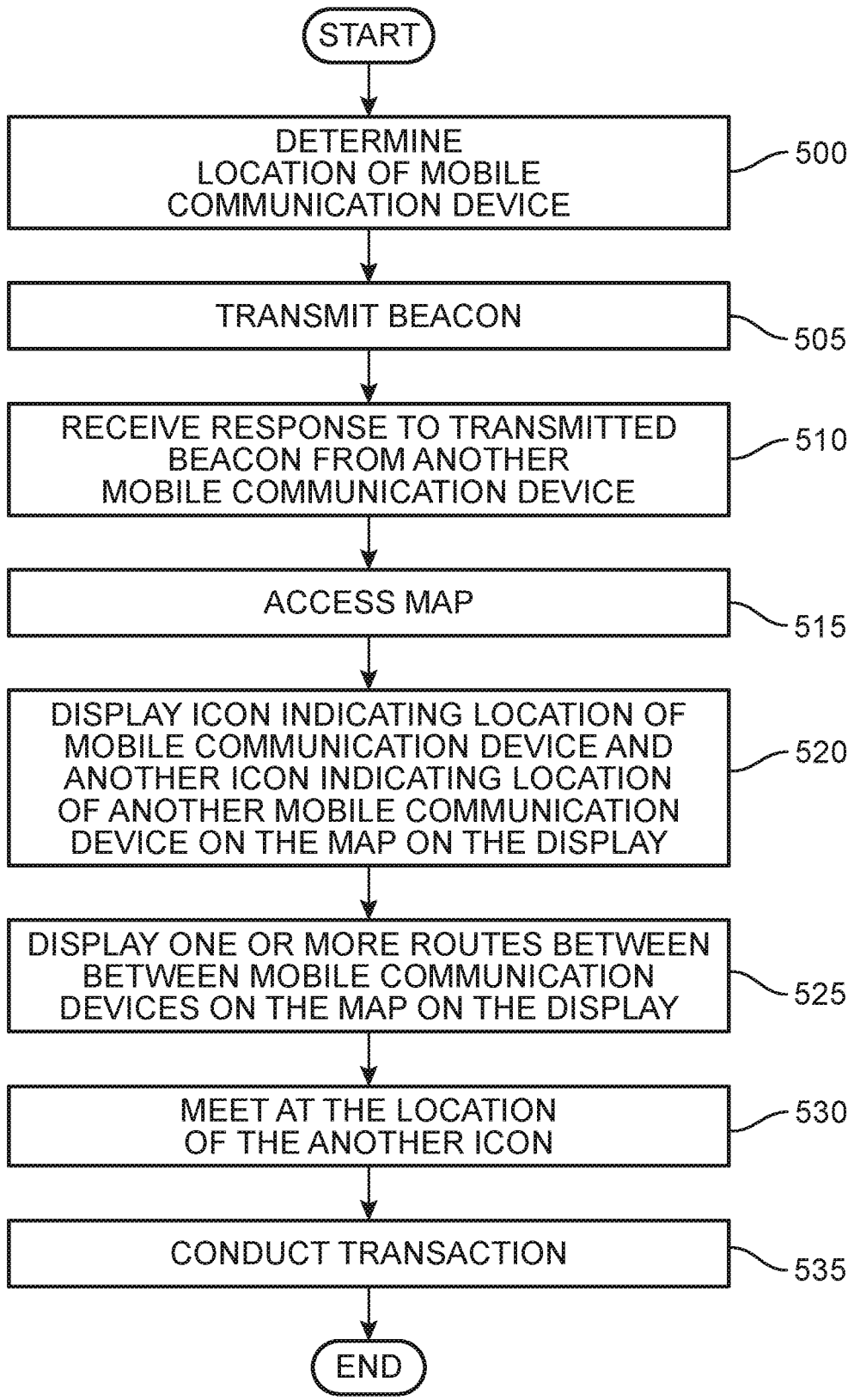
FIG. 5 is a flowchart illustrating a process for transmission of a beacon according to an embodiment.

FIG. 5 is a flowchart illustrating a process for transmission of a beacon according to an embodiment. With respect to FIG. 5, this embodiment will also be explained with reference to mobile communication device 225A in FIG. 3. Mobile communication device 225A is configured to provide a beacon by using beacon application 135. The beacon may include a message such as "$20.00 cash needed." Mobile communication device 225A determines whether to transmit a beacon. This determination may be in response to a user inputting a request through user interface 145 which is displayed on display 155. The mobile communication device 225A determines a location of the mobile communication device 225A using one of the applications 140 and/or GPS module 115 (operation 500) and transmits a beacon (505).

The mobile communication device 225A receives a response to the transmitted beacon from another mobile communication device such as mobile communication device 225B (operation 510). The response may be a message from the user of mobile communication device 225B in peer to peer communication with mobile electronic device 225A that the user has $20.00 cash for sale in exchange for a $25.00 electronic payment from the user of mobile communication device 225A. Both mobile communication device 225A and mobile communication device 225B are registered with the service provider 200 for authentication and for the electronic transfer of electronic currency from an account associated with the user of mobile communication device 225A to an account associated with the user of mobile communication device 225B.

In addition, the mobile communication device 225A can access a map (operation 515) which may be stored in memory 125 or may be accessible through one of the applications 140 and/or GPS module 115, which facilitates wireless communication with the wireless network 215 coupled to a network 205 such as the Internet. A service provider having a configuration similar to service provider 200 may be the ultimate source of the map information. By using one of the applications 140 and/or GPS module 115, a first display icon indicating a location of the mobile communication device 225A and a second display icon indicating a location of the mobile communication device 225B may be displayed on display 155 of mobile communication device 225A (operation 520). By using one of the applications 140 and/or GPS module 115, one or more routes from the mobile communication device 225A to the mobile communication device 225B is displayed on the display 155 of the mobile communication device 225B (operation 525). The user of the mobile communication device 225A can follow the route to meet the user of the mobile communication device 225B at the location of the user of mobile communication device 225B (operation 530) where the users can conduct a transaction (exchange) (operation 535). For example, the user of mobile communication device 225A can receive the cash from the user of mobile communication device 225B.

As discussed above, both mobile communication device 225A and mobile communication device 425B are registered with the service provider 200. In order to conduct the transaction in operation 535, the service provider 200 may require mutual authentication in this operation or at some other point during the process shown in FIG. 5. Mutual authentication by both mobile communication devices 100 may be required by the service provider 200. In order to conduct a transaction, one or more various types of mutual authentication may be required such as biometric authentication. For example, in order for mobile communication devices 225A and 225B to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. In addition, before conducting the transaction, both users may have exchanged pictures for additional verification. Because the service provider 200 provides the mutual authentication for both the user of mobile communication device 225A and the user of mobile communication device 225B, the user of mobile communication device 225A can electronically transmit electronic currency under the control of the service provider 200 to the user of mobile communication device 225B after the user of mobile communication device 225A receives the cash. The service provider 200 coordinates the electronic transfer of currency between accounts of two different users including providing mutual authentication.

Figure 6:
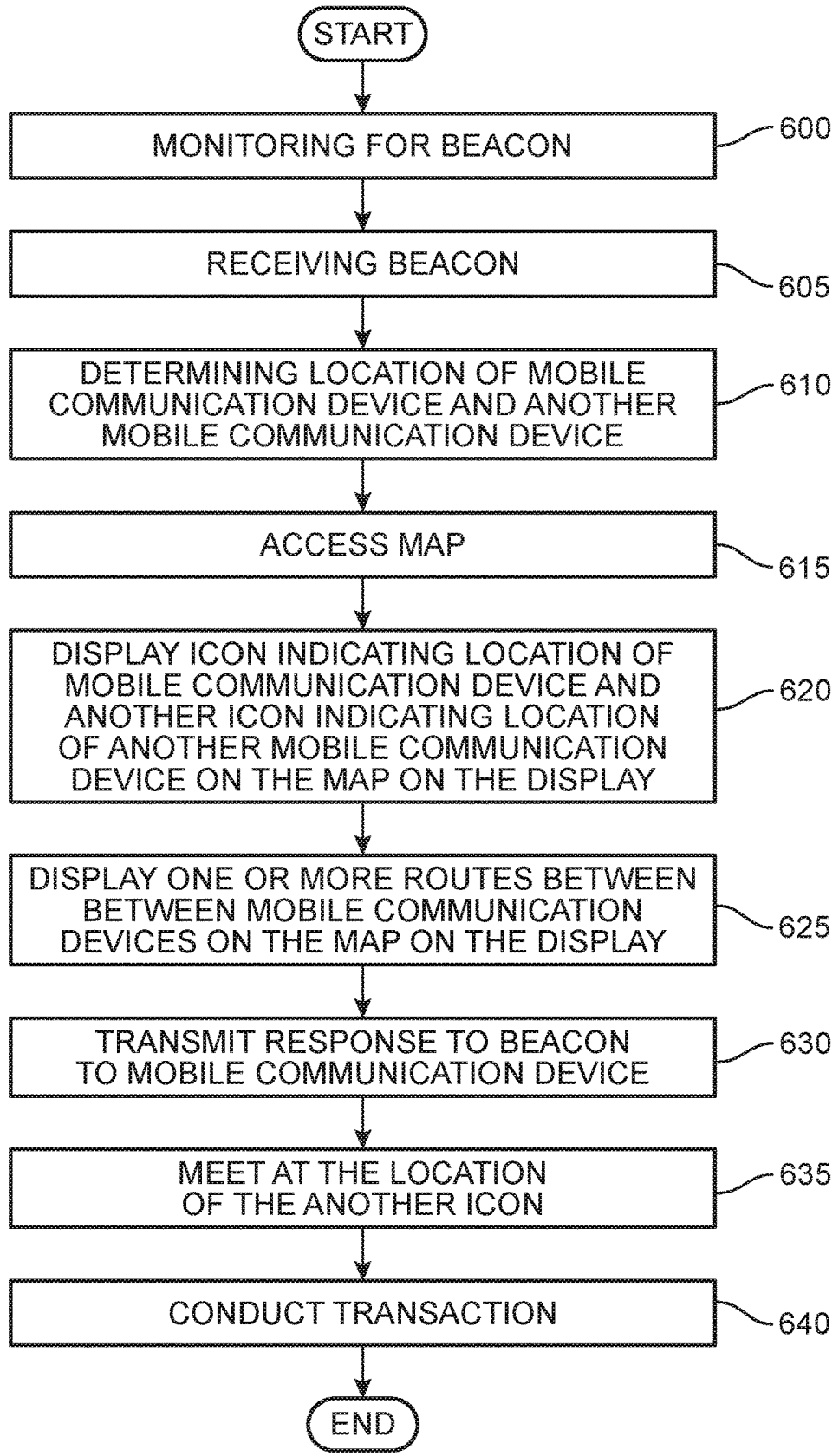
FIG. 6 is a flowchart illustrating a process for responding to a transmission in FIG. 5 according to an embodiment.

FIG. 6 is a flowchart illustrating a process for responding to a transmission in FIG. 5 according to an embodiment. With respect to FIG. 6, this embodiment will also be explained with reference to mobile communication device 225B in FIG. 3, which includes the structure of mobile communication device 100 of FIG. 1. As discussed above, a connection module 110 of a mobile communication device 225A may execute specialized hardware and/or software to passively monitor for the various wireless communications, for example, through a communication module 105 (operation 600). When a mobile communication device 225B detects a beacon (operation 605), both the mobile communication device 225A transmitting the beacon and the mobile communication device 225B receiving the beacon may ramp up in power and establish a peer to peer connection, where the connection may further enable the two mobile communication devices 225A and 225B to communicate additional information (operation 605). For example, the beacon may include a message such as "$20.00 cash needed." In addition, this connection may permit users of the mobile communication devices 225A and 225B to communicate additional information inputted through a user interface 145 or camera 150 and displayed on display 155. Both mobile communication device 225A and mobile communication device 225B are registered with the service provider 200 for mutual authentication and for the electronic transfer of electronic currency from an account associated with the user of mobile communication device 225A to an account associated with the user of mobile communication device 225B. Alternatively, electronic currency may be transferred from an account of the user of mobile communication device 225B to an account of the user of mobile communication device 225A.

The mobile communication device 225B may determine the location information of mobile communication device 225A (mobile communication device) and mobile communication device 225B (another mobile communication device) (operation 610). The mobile communication device 225B can access a map (operation 615) which may be stored in memory 125 or may be accessible through one of the applications 140 and/or GPS module 115, which facilitates wireless communication with the wireless network 215 coupled to a network 205 such as the Internet. A service provider having a configuration similar to service provider 200 may be the ultimate source of the map information.

By using one of the applications 140 and/or GPS module 115 of the mobile communication device 225B, a first display icon indicating a location of the mobile communication device 225A and a second display icon indicating a location of the mobile communication device 225B may be displayed on display 155 of mobile communication device 225B (operation 620). By using one of the applications 140 and/or GPS module 115, one or more routes from the mobile communication device 225B to the mobile communication device 225A is displayed on the display 155 of the mobile communication device 225B (operation 625). The user of the mobile communication device 225B can transmit a response to mobile communication device 225A. The response may be a message from the user of mobile communication device 225B in peer to peer communication with mobile electronic device 225A that the user has $20.00 cash for sale in exchange for a $25.00 electronic payment from the user of mobile communication device 225A (operation 630).

If the user of mobile communication device 225A agrees, the user of the mobile communication device A can meet the user of the mobile communication device B at the location of mobile communication device B (operation 635). For example, 225B225A the user of mobile communication device 225A can receive the cash (operation 640). As discussed above, both mobile communication device 225A and mobile communication device 225B are registered with the service provider 200. In order to conduct the transaction in operation 640 the service provider 200 may require mutual authentication in this operation or at some other point during the process shown in FIG. 6. Mutual authentication by both mobile communication devices 100 may be required by the service provider 200. In order to conduct a transaction, one or more various types of mutual authentication may be required such as biometric authentication. For example, in order for mobile communication devices 225A and 225B to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Because the service provider 200 provides the mutual authentication (as discussed above) for both the user of mobile communication device 225A and the user of mobile communication device 225B, the user of mobile communication device 225A can electronically transmit electronic currency under the control of the service provider 200 to the user of mobile communication device 225B after the user of mobile communication device 225A receives the cash. In addition, before conducting the transaction, both users may have exchanged pictures for additional verification.

Figure 7:
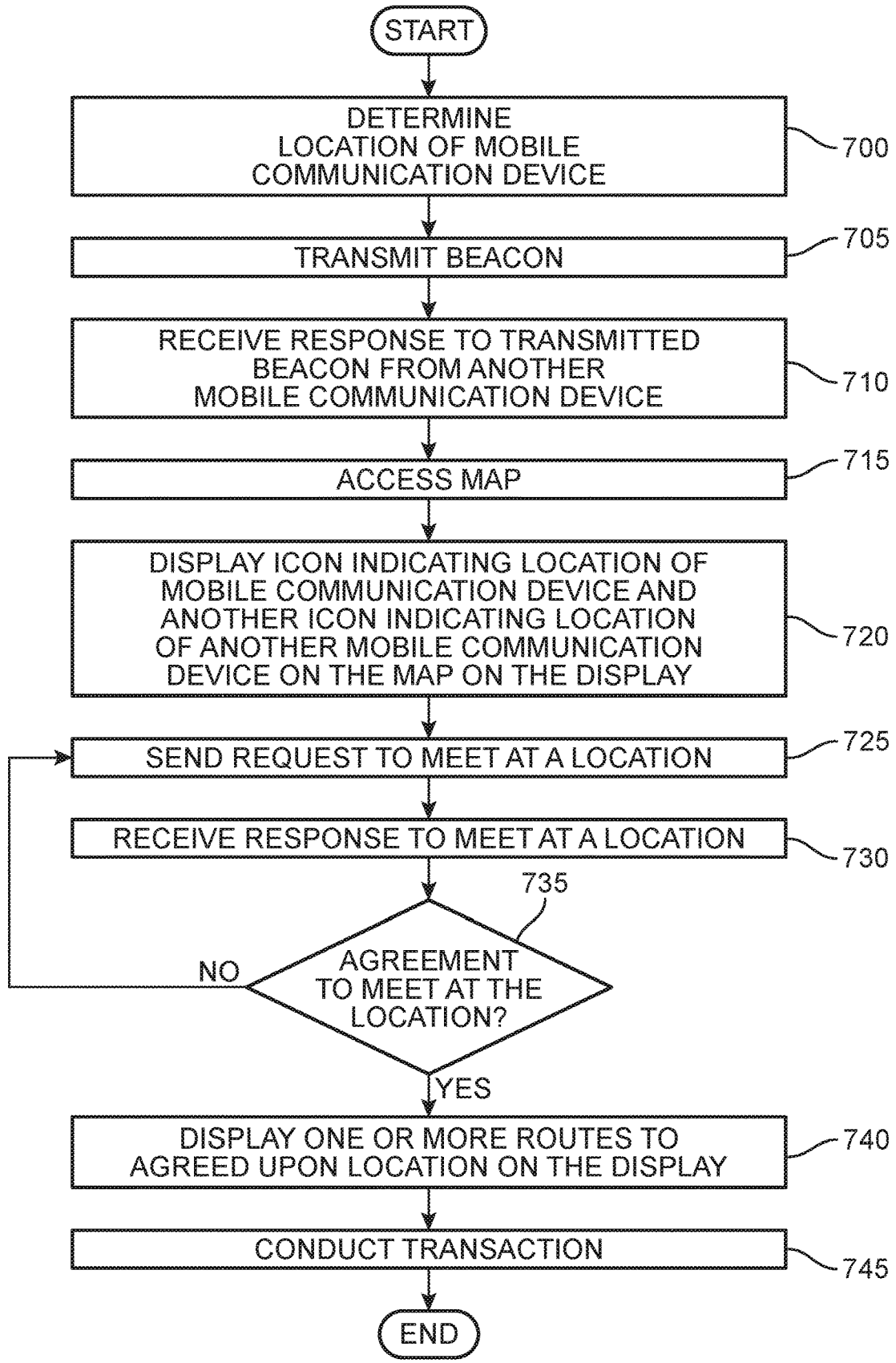
FIG. 7 is a flowchart illustrating a process for transmission of a beacon according to an embodiment.

FIG. 7 is a flowchart illustrating a process for transmission of a beacon according to an embodiment. With respect to FIG. 7, this embodiment will also be explained with reference to mobile communication device 225A in FIG. 3, which has the structure of mobile communication device 100 in FIG. 1. Mobile communication device 225A is configured to provide a beacon by using beacon application 135. The beacon may include a message such as "$20.00 cash needed." Mobile communication device 225A determines whether to transmit a beacon. This determination may be in response to a user inputting a request through user interface 145 which is displayed on display 155. The mobile communication device 225A determines a location of the mobile communication device 225A using one of the applications 140 (operation 700) and transmits a beacon (705).

The mobile communication device 225A receives a response to the transmitted beacon from another mobile communication device such as mobile communication device 225B (operation 710). The response may be a message from the user of mobile communication device 225B in peer to peer communication with mobile electronic device 225A that the user has $20.00 cash for sale in exchange for a $25.00 electronic payment from the user of mobile communication device 225A. The mobile communication device 225A can access a map (operation 715) which may be stored in memory 125 or may be accessible through one of the applications 140 and/or GPS module 115, which facilitates wireless communication with the wireless network 215 coupled to a network 205 such as the Internet. Both mobile communication device 225A and mobile communication device 225B are registered with the service provider 200 for authentication and for the electronic transfer of electronic currency from an account associated with the user of mobile communication device 225A to an account associated with the user of mobile communication device 225B. Alternatively, electronic currency may be transferred from an account of the user of mobile communication device 225B to an account of the user of mobile communication device 225A.

A service provider having a configuration similar to service provider 200 may be the ultimate source of the map information. By using one of the applications 140 and/or GPS module 115, a first display icon indicating a location of the mobile communication device 225A and a second display icon indicating a location of the mobile communication device 225B may be displayed on display 155 of mobile communication device 225A (operation 720).

The user through the user interface 145 inputs a request to meet at a proposed location and transmits the request from the mobile communication device 225A to the mobile communication device 225B (operation 725). The user of the mobile communication device 225B sends a response to the request, which is received by mobile communication device 225A (operation (730). If the response is "No" (operation 735), the user of the mobile communication device 225A can suggest to meet at another location (operation 725) so that the user of the mobile communication device 225B can respond to this request (operation 730). If an agreement on a location is reached, the response is "Yes" (operation 735).

By using one of the applications 140 and/or GPS module 115, one or more routes from the mobile communication device 225A to the agreed upon location is displayed on the display 155 of the mobile communication device 225B (operation 740). The user of the mobile communication device 225A can follow the route to meet the user of the mobile communication device 225B at the agreed upon location. where the users can conduct a transaction (exchange) (operation 745). For example, the user of mobile communication device 225A can receive the cash and electronically transfer currency. As discussed above, both mobile communication device 225A and mobile communication device 225B are registered with the service provider 200. In order to conduct the transaction in operation 745, the service provider 200 may require mutual authentication in this operation or at some other point during the process shown in FIG. 7. Mutual authentication by both mobile communication devices 100 may be required by the service provider 200. In order to conduct a transaction, one or more various types of mutual authentication may be required such as biometric authentication. For example, in order for mobile communication devices 225A and 225B to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Because the service provider 200 provides the mutual authentication (as discussed above) for both the user of mobile communication device 225A and the user of mobile communication device 225B, the user of mobile communication device 225A can electronically transmit electronic currency under the control of the service provider 200 to the user of mobile communication device 225B after the user of mobile communication device 225A receives the cash. In addition, before conducting the transaction, both users may have exchanged pictures for additional verification.

In other embodiments, additional operations to negotiate the transaction before the agreed upon meeting may also be added.

Figure 8:
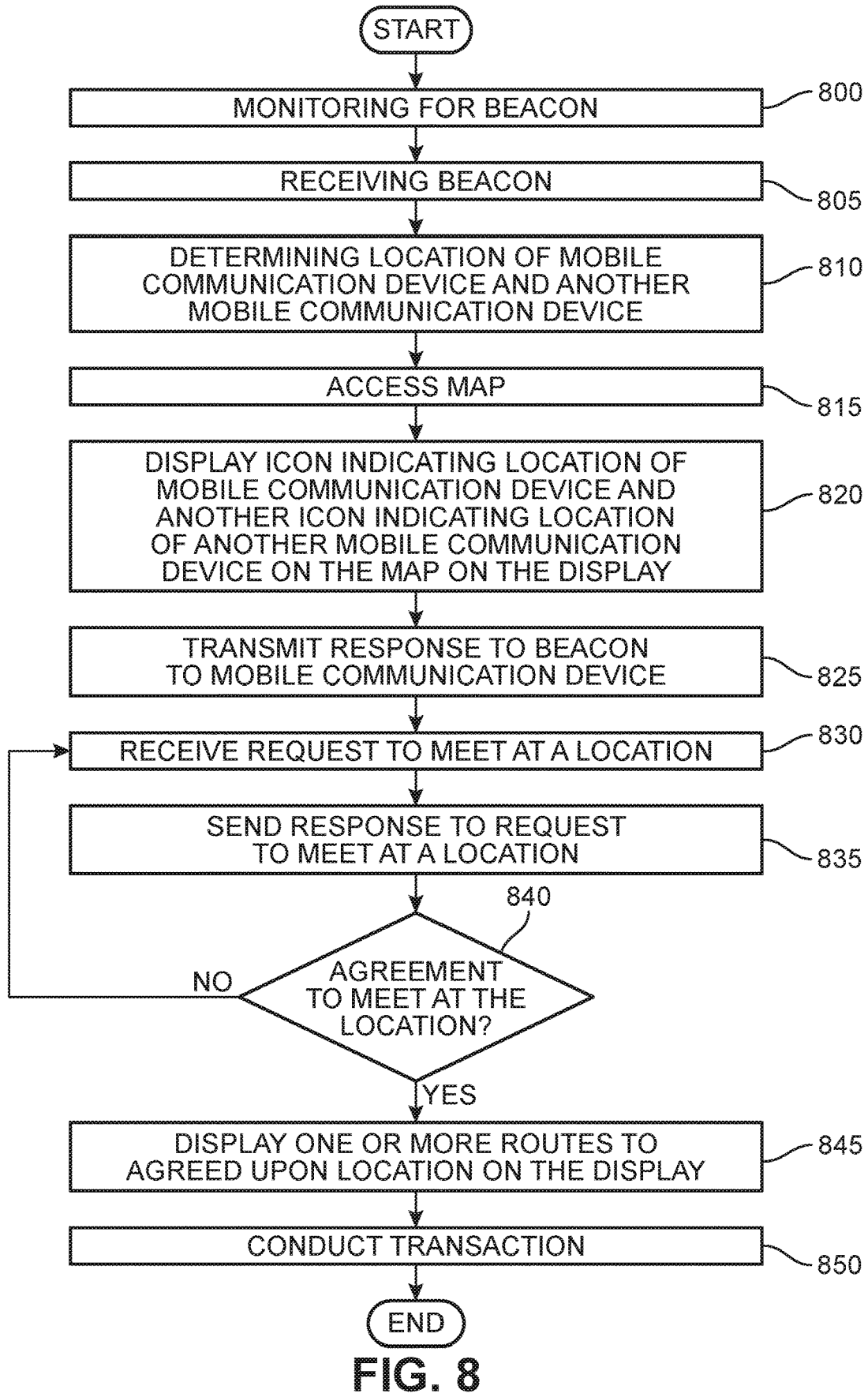
FIG. 8 is a flowchart illustrating a process for responding to a transmission in FIG. 7 according to an embodiment.

FIG. 8 is a flowchart illustrating a process for responding to a transmission in FIG. 7 according to an embodiment. With respect to FIG. 8, this embodiment will also be explained with reference to mobile communication device 225B in FIG. 3, which has the structure of mobile communication device 100 in FIG. 1. As discussed above, a connection module 110 of a mobile communication device 225A may execute specialized hardware and/or software to passively monitor for the various wireless communications, for example, through a communication module 105 (operation 800). When a mobile communication device 225B detects a beacon (operation 805), both the mobile communication device 225A transmitting the beacon and the mobile communication device 225B receiving the beacon may ramp up in power and establish a peer to peer connection, where the connection may further enable the two mobile communication devices 225A and 225B to communicate additional information (operation 805). For example, the beacon may include a message such as "$20.00 cash needed." In addition, this connection may permit users of the mobile communication devices 100 to communicate additional information inputted through a user interface 145 or camera 150 and displayed on display 155. Both mobile communication device 225A and mobile communication device 225B are registered with the service provider 200 for authentication and for the electronic transfer of electronic currency from an account associated with the user of mobile communication device 225A to an account associated with the user of mobile communication device 225B. Alternatively, electronic currency may be transferred from an account of the user of mobile communication device 225B to an account of the user of mobile communication device 225A.

The mobile communication device 225B may determine the location information of mobile communication device 225A (mobile communication device) and mobile communication device 225B (another mobile communication device) (operation 810). The mobile communication device 225B can access a map (operation 815) which may be stored in memory 125 or may be accessible through one of the applications 140 and/or GPS module 115, which facilitates wireless communication with the wireless network 215 coupled to a network 205 such as the Internet. A service provider having a configuration similar to service provider 200 may be the ultimate source of the map information.

By using one of the applications 140 and/or GPS module 115 of the mobile communication device 225B, a first display icon indicating a location of the mobile communication device 225A and a second display icon indicating a location of the mobile communication device 225B may be displayed on display 155 of mobile communication device 225B (operation 820).

The user of the mobile communication device 225B can transmit a response to mobile communication device 225A. The response may be a message from the user of mobile communication device 225B in peer to peer communication with mobile electronic device 225A that the user has $20.00 cash for sale in exchange for a $25.00 electronic payment from the user of mobile communication device 225A (operation 825).

If the user through the user interface 145 of mobile communication device 225B receives a request to meet at a proposed location from the mobile communication device 225A (operation 830). The user of the mobile communication device 225B sends a response to the request (operation (835). If the response is "No" (operation 840), the user of the mobile communication device 225A can suggest to meet at another location (operation 830) so that the user of the mobile communication device 225B can responds to this request (operation 835). If an agreement on a location is reached, the response is "Yes" (operation 840)

By using one of the applications 140, one or more routes from the mobile communication device 225B to the agreed upon location is displayed on the display 155 of the mobile communication device 225B (operation 845). The user of the mobile communication device 225B can follow the route to meet the user of the mobile communication device 225A at the agreed upon location. where the users can conduct a transaction (exchange) (operation 850). For example, 225A the user of mobile communication device 225A can receive the cash. As discussed above, both mobile communication device 225A and mobile communication device 225B are registered with the service provider 200. In order to conduct the transaction in operation 850, the service provider 200 may require mutual authentication in this operation or at some other point during the process shown in FIG. 8. Mutual authentication by both mobile communication devices 100 may be required by the service provider 200. In order to conduct a transaction, one or more various types of mutual authentication may be required such as biometric authentication. For example, in order for mobile communication devices 225A and 225B to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Because the service provider 200 provides the mutual authentication (as discussed above) for both the user of mobile communication device 225A and the user of mobile communication device 225B, the user of mobile communication device 225A can electronically transmit electronic currency under the control of the service provider 200 to the user of mobile communication device 225B after the user of mobile communication device 225A receives the cash. In addition, before conducting the transaction, both users may have exchanged pictures for additional verification.

In other embodiments, additional operations to negotiate the transaction before the agreed upon meeting may also be added.

Figure 9:
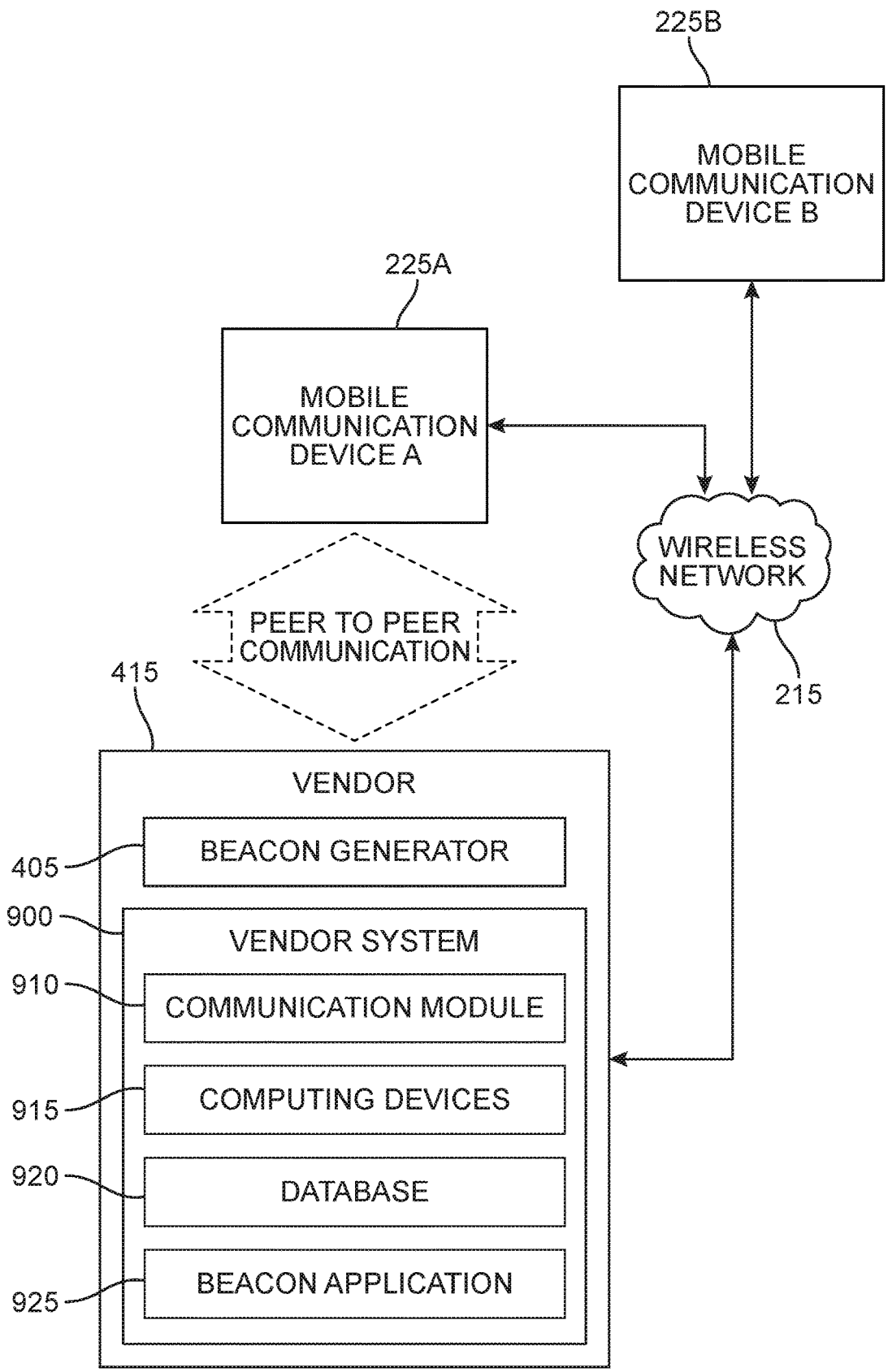
FIG. 9 is a schematic view of a mobile communication device of FIG. 1 in an environment of FIGS. 4A-4B according to an embodiment.

FIG. 9 is a schematic view of a mobile communication device of FIG. 1 in an environment of FIGS. 4A-4B according to an embodiment. FIG. 9. Shows mobile communication device 225A and mobile communication device 225B, which are wirelessly connected to wireless network 215 by one or two base stations (not shown). The wireless network 215 may also be connected wirelessly though a base station (not shown) to a vendor 415 at a stadium. The vendor 415 may include a structure with a beacon generator 405 mounted to a structure or resting on a structure and a vendor system 900, which may include a communication module 910 to communicate with the wireless network 215 through a base station 220. The vendor system 900 may also include a communication module 910, one or more computing devices 915, a database 920 and a beacon application 925 to interface with the beacon generator 405, which generates and transmits the beacon (beacon signal). Once the beacon is received by mobile communication device 225A and/or mobile communication device 225B, a message contained in the beacon may be read by the respective mobile communication terminals 225A and 225B. The message may be cash is available at this vendor 415. If the user of mobile communication terminal 225A needs cash, a map showing the vendor 400 may be displayed on the display 155 of the mobile communication device 225A along with a route from the current position of mobile communication terminal 225A to the vendor 415. Once the user of mobile communication terminal 225A arrives at the vendor 415, the user may use the mobile communication terminal 225A to electronically send cash to an account of vendor 400 and the vendor 415 can provide cash to the user of mobile communication terminal 225A. Mobile communication devices 225A and 225B as well as vendor 415 have a beacon application 135 are registered with the service provider 200, so that service provider 200 can be used to electronically transmit currency or electronically receive currency. Mutual authentication of mobile communication devices such as mobile communication devices 225A and 225B and a vendor 415 may be required by the service provider 200. In order to conduct a transaction, one or more various types of mutual authentication may be required such as biometric authentication. For example, in order for mobile communication device 225A and vendor 415 to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Therefore, each user may be confident about the integrity of the electronic transaction. In addition, pictures may be exchanged to provide additional verification.

Figure 10:
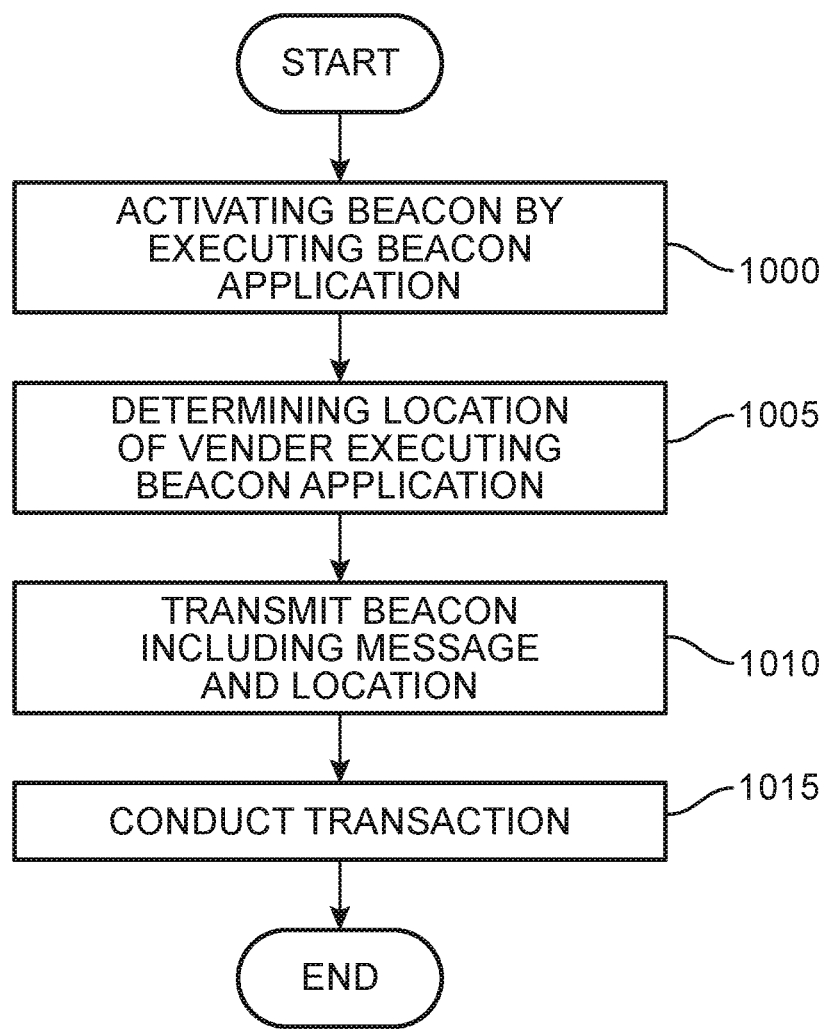
FIG. 10 is a flowchart illustrating a process for transmission of a beacon according to an embodiment.

FIG. 10 is a flowchart illustrating a process for transmission of a beacon according to an embodiment. With respect to FIG. 10, this embodiment will also be explained with respect to mobile communication devices 225A and 225B as well as vendor 415 in FIG. 9. A beacon may be activated by executing the beacon application 925 to instruct the beacon generator 905 to generate the beacon (operation 1000). The vendor system 900 determines the location of the vendor 415 by executing the beacon application 925 (operation 1005). Alternatively, another application may cause the vendor system 900 to determine the location of the vendor 415. The beacon is transmitted by the beacon generator 905, and the beacon includes a message and location of the vendor 400 (operation 1010). The message may be "cash available." A transaction is conducted with a user of a mobile communication device such as mobile communication device 225A or mobile communication device 225B at the vendor (operation 1015). For example, the user of mobile communication device 225A may electronically transfer funds to vendor 415 in exchange for cash. Both mobile communication device 225A and vendor 415 are registered with the service provider 200 for authentication and for the electronic transfer of electronic currency from an account associated with the user of mobile communication device 225A to an account associated with vendor 415. Alternatively, electronic currency may be transferred from an account of the vendor 415 to an account of the user of mobile communication device 225A.

As discussed above, both mobile communication device 225A and vendor 415 are registered with the service provider 200. In order to conduct the transaction in operation 1015, the service provider 200 may require mutual authentication in this operation or at some other point during the process shown in FIG. 10. Mutual authentication by both mobile communication device 225A and vendor 415 may be required by the service provider 200. In order to conduct a transaction, one or more various types of mutual authentication may be required such as biometric authentication. For example, in order for mobile communication devices 225A and vendor 415 to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Because the service provider 200 provides the mutual authentication (as discussed above) for both the user of mobile communication device 225A and the vendor 415 can electronically transmit electronic currency under the control of the service provider 200 to the user of mobile communication device 415 before or after the user of mobile communication device 225A receives the cash. In addition, before conducting the transaction, vendor 415 and user of the mobile communication device 225A have exchanged pictures for additional verification.

Figure 11:
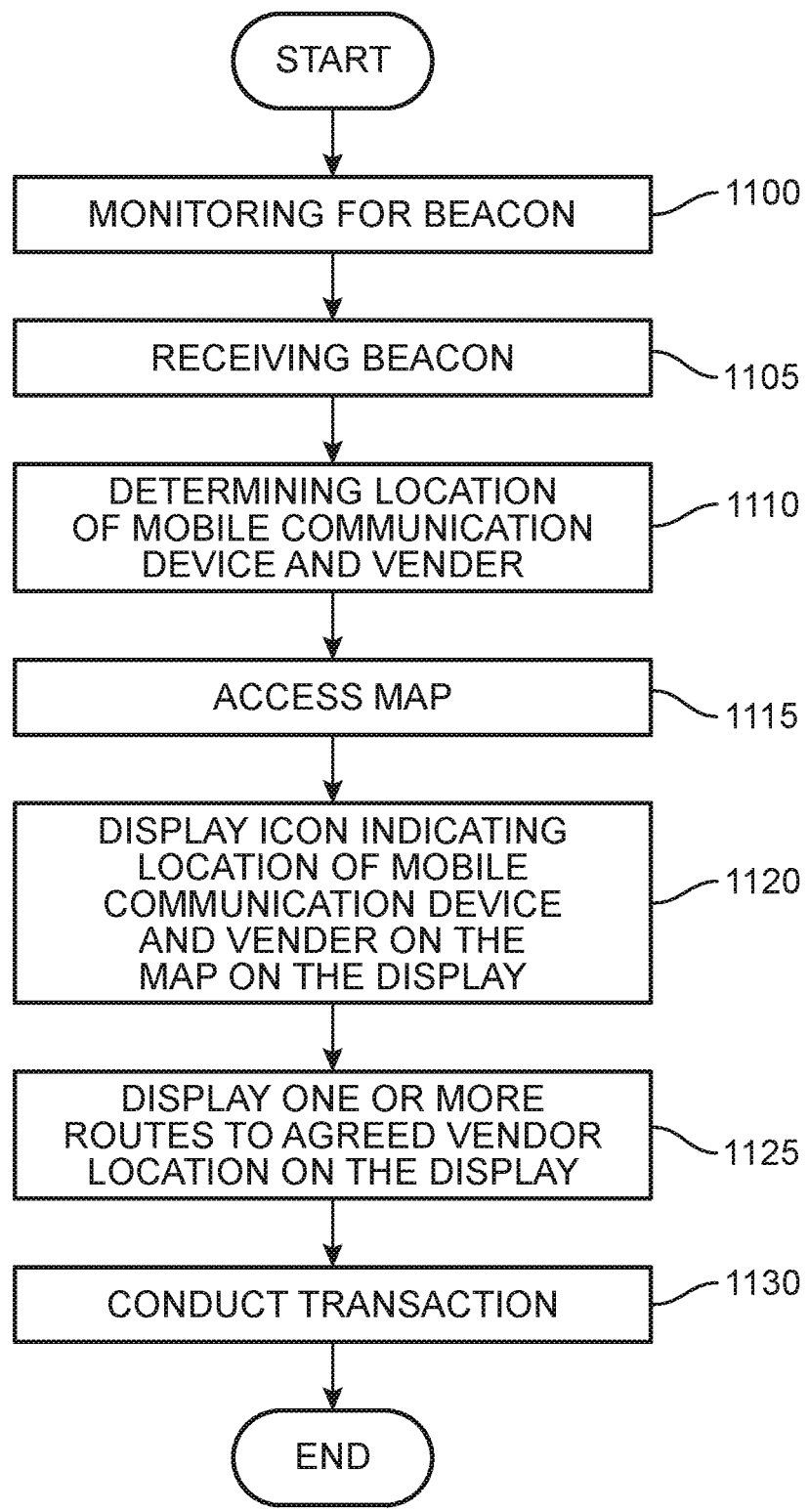
FIG. 11 is a flowchart illustrating a process for receiving a beacon according to an embodiment.

FIG. 11 is a flowchart illustrating a process for receiving a beacon according to an embodiment. With respect to FIG. 11, this embodiment will also be explained with respect to mobile communication device 225A and 225B as well as vendor 415 in FIG. 9. One of the mobile communication devices such as mobile communication device 25B may be monitoring for a beacon (operation 1100) and receive a beacon (operation 1105) from a vendor 400. The beacon includes a message and location of the vendor 415. The message may be "cash available." The mobile communication device 225B may determine the location of the mobile communication device 225B and the vendor 415 (operation 1110). The mobile communication device 225B may access a map (operation 1115) and may display an icon indicating the location of the mobile communication device on a map on the display 145 and another icon indicating the location of the vendor on the map on the display 145 (operation 1120). The mobile communication device 225 may display one or more routes to vendor location on the display 145 of the mobile communication device 225B (operation 1125). A transaction is conducted with a user of a mobile communication device 225B at the vendor 415 (operation 1130). For example, the user of mobile communication device 225B may electronically transfer funds to vendor 415 in exchange for cash. Both mobile communication device 225B and vendor 415 are registered with the service provider 200 for authentication and for the electronic transfer of electronic currency from an account associated with the user of mobile communication device 225B to an account associated with vendor 415. Alternatively, electronic currency may be transferred from an account of the vendor 415 to an account of the user of mobile communication device 225B.

As discussed above, both mobile communication device 225B and vendor 415 are registered with the service provider 200. In order to conduct the transaction in operation 1130, the service provider 200 may require mutual authentication in this operation or at some other point during the process shown in FIG. 11. Mutual authentication by both mobile communication device 225B and vendor 415 may be required by the service provider 200. In order to conduct a transaction, one or more various types of mutual authentication may be required such as biometric authentication. For example, for mobile communication devices 225B and vendor 415 to allow users to conduct a transaction, the users may be required to provide a fingerprint or other biometric information to unlock a vault containing a private key in a trusted execution environment (TEE) or a Trusted Platform Module (TPM). Each user may have their own private key associated with the biometric authentication. This private key enables a user to sign and encrypt information to conduct an electronic transaction. Other types of mutual authentication may also be used. Because the service provider 200 provides the mutual authentication (as discussed above) for both the user of mobile communication device 225B and the vendor 415, mobile communication 225 can electronically transmit electronic currency under the control of the service provider 200 to the vendor 415 before or after the user of mobile communication device 225B receives the cash. In addition, before conducting the transaction, vendor 415 and user of the mobile communication device 225B have exchanged pictures for additional verification.

A transaction involving cash is only one exemplary embodiment. Other transactions are also within the scope of embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

A non-transitory computer readable medium may store software comprising instructions executable by one or more computing devices (computers).

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

One or more embodiments may utilize any kind of network (wired or wireless) for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of locating mobile communication devices in a peer to peer communication using a beacon at a venue, the method comprising:

registering a first mobile communication device with a service provider configured to coordinate electronic transfer of currency between accounts of two different users;

determining, by the first mobile communication device, a first location of the first mobile communication device at the venue;

transmitting the beacon from the first mobile communication device to one or more other mobile communication devices at the venue, wherein the beacon includes a message requesting a cash payment of a first amount;

receiving, by the first mobile communication device, a response message to the message requesting cash payment included in the transmitted beacon from a second mobile communication device of the one or more other mobile communication devices at the venue, wherein the second mobile communication device is also registered with the same service provider as the first mobile communication device;

establishing the peer to peer communication between the first mobile communication device and the second mobile communication device based on the response message;

receiving, by the first mobile communication device, a second location of the second mobile communication device at the venue from the second mobile communication device;

accessing, by the first mobile communication device, a map of the venue, which includes the first location and the second location, and displaying the map on a display of the first mobile communication device;

displaying a first icon indicating the first location and a second icon indicating the second location on the map of the display of the first mobile communication device;

determining and displaying one or more routes between the first location and the second location on the displayed map of the venue on the first mobile communication device;

wherein, when the first mobile communication device is located at the second location at the venue, conducting a transaction between the first mobile communication device and the second mobile communication device to exchange an electronic transfer of currency for the cash payment of the first amount;

wherein, prior to conducting the transaction between the first mobile communication device and the second mobile communication device, the service provider requires that both the first mobile communication device and the second mobile communication device provide respective private keys for a mutual authentication to the service provider in order to conduct the transaction, each private key enabling a user associated with a respective mobile communication device to sign information to conduct the transaction, the private keys each being obtained by the respective mobile communication device by using biometric information from the respective user associated with the respective mobile communication device to unlock a respective vault hosted by a trusted third party containing the respective private key; and wherein, after the private keys for the mutual authentication from both the first mobile communication device and the second mobile communication device are received by the service provider, the service provider coordinates the electronic transfer of currency between an account of a first user associated with the first mobile communication device to an account of a second user associated with the second mobile communication device to conduct the transaction.

2. The method according to claim 1, wherein the first mobile communication device comprises one of a smartphone, a tablet, a smartwatch, a smart glass, a smart helmet, and a laptop, and the second mobile communication device comprises one of a smartphone, a tablet, a smartwatch, a smart glass, a smart helmet, and a laptop.

3. The method according to claim 1, further comprising displaying a third icon indicating the first location and a fourth icon indicating the second location on a map displayed on a display of the second mobile communication device.

4. The method according to claim 1, wherein the response message is generated by the second mobile communication device in response to an input through a user interface of the second mobile communication device.

5. The method according to claim 1, the method further comprising:
receiving and displaying at the first mobile communication device a picture of the second user to verify the second mobile communication device; and
receiving and display at the second mobile communication device a picture of the first user to verify the first mobile communication device.

6. The method according to claim 5, wherein the transaction includes transmitting the currency electronically using the first mobile communication device to an account of the second user in exchange for the cash payment of the first amount to the first user from the second user, wherein the electronically transmitted currency is a second amount that is greater than the first amount of the cash payment.

7. The method according to claim 5, wherein the transaction includes transmitting the currency electronically using the first mobile communication device to an account of the second user in exchange for a cash purchase of an article from a vendor at the venue by the second user, wherein the article is provided to the first user from the second user upon completion of the transaction.

8. A non-transitory computer readable medium storing software comprising instructions executable by one or more computers, which, upon such execution, cause the one or more computers to:
register a first mobile communication device with a service provider configured to coordinate electronic transfer of currency between accounts of two different users;
determine a first location of the first mobile communication device at a venue;
transmit a beacon from the first mobile communication device to one or more other mobile communication devices at the venue, wherein the beacon includes a message requesting a cash payment of a first amount;
receive, at the first mobile communication device, a response message to the message requesting cash payment included in the transmitted beacon from a second mobile communication device of the one or more other mobile communication devices at the venue, wherein the second mobile communication device is also registered with the same service provider as the first mobile communication device;
establish a peer to peer communication between the first mobile communication device and the second mobile communication device based on the response message;
receive, at the first mobile communication device, a second location of the second mobile communication device at the venue from the second mobile communication device;
access a map of the venue, which includes the first location and the second location, and display the map on a display of the first mobile communication device;
display a first icon indicating the first location and a second icon indicating the second location on the map of the display of the first communication device;
determine and display one or more routes between the first location and the second location on the displayed map of the venue on the first mobile communication device;
wherein, when the first mobile communication device is located at the second location at the venue, conduct a transaction between the first mobile communication device and the second mobile communication device to exchange an electronic transfer of currency for the cash payment of the first amount;

wherein, prior to conducting the transaction between the first mobile communication device and the second mobile communication device, the service provider requires that both the first mobile communication device and the second mobile communication device provide respective private keys for a mutual authentication to the service provider in order to conduct the transaction, each private key enabling a user associated with a respective mobile communication device to sign information to conduct the transaction, the private keys each being obtained by the respective mobile communication device by using biometric information from the respective user associated with the respective mobile communication device to unlock a respective vault hosted by a trusted third party containing the respective private key; and wherein, after the private keys for the mutual authentication from both the first mobile communication device and the second mobile communication device are received by the service provider, the service provider coordinates the electronic transfer of currency between an account of a first user associated with the first mobile communication device to an account of a second user associated with the second mobile communication device to conduct the transaction.

9. The non-transitory computer readable medium storing software of claim 8, wherein the first mobile communication device comprises one of a smartphone, a tablet, a smartwatch, a smart glass, a smart helmet, and a laptop, and the second mobile communication device comprises one of a smartphone, a tablet, a smartwatch, a smart glass, a smart helmet, and a laptop.

10. The non-transitory computer readable medium storing software instructions of claim 8, wherein the instructions executable by one or more computers, upon such execution, cause the one or more computers to display a third icon indicating the first location and a fourth icon indicating the second location on a map displayed on a display of the second mobile communication device.

11. The non-transitory computer readable medium storing software of claim 8, wherein the response message is generated by the second mobile communication device in response to an input through a user interface of the second mobile communication device.

12. The non-transitory computer readable medium storing software of claim 8, the instructions further causing the one or more computers to:
receive and display at the first mobile communication device a picture of the second user to verify the second mobile communication device; and
receive and display at the second mobile communication device a picture of the first user to verify the first mobile communication device.

13. The non-transitory computer readable medium storing software of claim 12, wherein the transaction includes transmitting the currency electronically using the first mobile communication device to an account of the second user in exchange for the cash payment of the first amount to the first user from the second user, wherein the electronically transmitted currency is a second amount that is greater than the first amount of the cash payment.

14. The non-transitory computer readable medium storing software of claim 12, wherein the transaction includes transmitting the currency electronically using the first mobile communication device to an account of the second user in exchange for a cash purchase of an article from a vendor at the venue by the second user, wherein the article is provided to the first user from the second user upon completion of the transaction.

15. A system of locating mobile communication devices in a peer to peer communication using a beacon at a venue, the system comprising:
a wireless network coupled to a plurality of base stations at the venue;
a first mobile communication device located at the venue, the first mobile communication device configured to determine a first location of the first mobile communication device at the venue and to transmit a beacon to one or more other mobile communication devices at the venue, wherein the beacon includes a message requesting a cash payment of a first amount, the first mobile communication device being coupled to the wireless network though one of the plurality of base stations; and
a second mobile communication device of the one or more other mobile communication devices at the venue, the second mobile communication device configured to determine a second location of the second mobile communication device at the venue and to receive the beacon from the first mobile communication device, the second mobile communication device being coupled to the wireless network though one of the plurality of base stations;
a service provider configured to coordinate electronic transfer of currency between accounts of two different users, wherein the first mobile communication device and the second mobile communication device are both registered with the service provider;
the first mobile communication device being further configured to receive a response message to the message requesting cash payment included in the transmitted beacon from the second mobile communication device, and to establish a peer to peer communication with the second mobile communication device based on the response message;
the second mobile communication device being configured to transmit the second location of the second mobile communication device at the venue to the first mobile communication device; and
the first mobile communication device being configured to:
access a map of the venue, which includes the first location and the second location, and display the map on a display of the first mobile communication device;
display a first icon indicating the first location and a second icon indicating the second location on the map of the display of the first mobile communication device;
determine and display one or more routes between the first location and the second location on the displayed map of the venue on the first mobile communication device;
wherein, when the first mobile communication device is located at the second location at the venue, the first mobile communication device is configured to conduct a transaction between the first mobile communication device and the second mobile communication device to exchange an electronic transfer of currency for the cash payment of the first amount;
wherein, prior to conducting the transaction between the first mobile communication device and the second mobile communication device, the service provider requires that both the first mobile communication device and the second mobile communication device provide respective private keys for a mutual authentication to the service provider in order to conduct the transaction, each private key enabling a user associated with a respective mobile communication device to sign information to conduct the transaction, the private keys each being obtained by the respective mobile communication device by using biometric information from the respective user associated with the respective mobile communication device to unlock a respective vault hosted by a trusted third party containing the respective private key; and wherein, after the private keys for the mutual authentication from both the first mobile communication device and the second mobile communication device are received by the service provider, the service provider coordinates the electronic transfer of currency between an account of a first user associated with the first mobile communication device to an account of a second user associated with the second mobile communication device to conduct the transaction.

16. The system according to claim 15, wherein the first mobile communication device comprises one of a smartphone, a tablet, a smartwatch, a smart glass, a smart helmet, and a laptop, and the second mobile communication device comprises one of a smartphone, a tablet, a smartwatch, a smart glass, a smart helmet, and a laptop.

17. The system according to claim 15, wherein the response message is generated by the second mobile communication device in response to an input through a user interface of the second mobile communication device.

18. The system according to claim 15,
wherein the first mobile communication device is configured to receive and display a picture of the second user to verify the second mobile communication device; and
wherein the second mobile communication device is configured to receive and display a picture of the first user to verify the first mobile communication device.

19. The system according to claim 18, wherein the transaction includes transmitting the currency electronically using the first mobile communication device to an account of the second user in exchange for the cash payment of the first amount to the first user from the second user, wherein the electronically transmitted currency is a second amount that is greater than the first amount of the cash payment.

20. The system according to claim 18, wherein the transaction includes transmitting the currency electronically using the first mobile communication device to an account of the second user in exchange for a cash purchase of an article from a vendor at the venue by the second user, wherein the article is provided to the first user from the second user upon completion of the transaction.

* * * * *